(12) United States Patent  (10) Patent No.: US 6,285,394 B1
Huang  (45) Date of Patent: Sep. 4, 2001

(54) VIDEO MONITORING SYSTEM

(76) Inventor: James L. F. Huang, 16F-1, No. 4, Sec. 3, Min-Chuan E. Rd., Taipei (TW)

( * ) Notice: Subject to any disclaimer, the term of this patent is extended or adjusted under 35 U.S.C. 154(b) by 0 days.

(21) Appl. No.: 09/307,553

(22) Filed: May 10, 1999

(51) Int. Cl.⁷ .................................................. H04N 7/18
(52) U.S. Cl. ........................................... 348/143; 348/158
(58) Field of Search ........................... 348/143, 148–150, 348/152–156, 158, 159; 379/37–40, 44–49

(56) References Cited

U.S. PATENT DOCUMENTS

| | | | |
|---|---|---|---|
| 5,144,661 | * 9/1992 | Shamosh et al. | 380/9 |
| 5,264,828 | * 11/1993 | Meiksin et al. | 340/539 |
| 5,319,698 | * 6/1994 | Glidewell et al. | 379/39 |
| 5,587,701 | * 12/1996 | Hess | 340/541 |
| 6,052,052 | * 4/2000 | Delmonaco | 340/539 |

* cited by examiner

Primary Examiner—Vu Le
(74) Attorney, Agent, or Firm—Bacon & Thomas, PLLC

(57) ABSTRACT

A video monitoring system, which includes a transmitter unit having an alarm means and an audio-video means, a receiver unit having a keyboard means and an audio-video means, monitors and video cameras and wired/cordless alarm devices and video cassette recorders respectively connected to the transmitter unit and the receiver unit, the transmitter unit being controlled by the user through the receiver unit to monitor status at predetermined detecting zones at a distance. Wired/cordless alarm devices at the transmitter unit are triggered to alarm when a particular condition happens, and at the same time the video cassette recorder is simultaneously driven to record the event, and an automatic dialer dials particular telephone numbers to give an alarm signal.

19 Claims, 8 Drawing Sheets

VIDEO MONITORING SYSTEM

BACKGROUND OF THE INVENTION

The present invention relates to a video monitoring system, and more particularly to such a video monitoring system which comprises a transmitter unit that detect predetermined detecting zones, and a receiver unit which is operated by the user to control the operation of the transmitter unit at a distance.

Regular commercially available video telephones can only transmit audio/video signals, and provides only one single picture. These video telephones cannot be linked to a video camera for image output. When a video telephone is connected, it immediately transmits detected image to the opposite party without through a recognition process. Further, these video telephones do not provide burglar-alarm function, remote control function, or automatic dialing function. If a remote control function is required, additional circuit means must be installed.

SUMMARY OF THE INVENTION

It is one object of the present invention to provide a video monitoring system which uses a transmitter unit and a receiver unit to monitor predetermined detecting zones, enabling the user to control the operation of the transmitter unit in monitoring predetermined detecting zones through the receiver unit at a distance. It is another object of the present invention to provide a video monitoring system which provides an automatic dialing function. It is still another object of the present invention to provide a video monitoring system which allows the user to connect external monitors and speakers to the transmitter unit and the receiver unit. It is still another object of the present invention to provide a video monitoring system which enables the user to connect one or at least four video cameras to the transmitter unit and the receiver unit to simultaneously monitor different detecting zones. It is still another object of the present invention to provide a video monitoring system which has wired/cordless alarm devices and video cassette recorders respectively connected to the transmitter unit and the receiver unit. It is still another object of the present invention to provide a video monitoring system which enables the user to disconnect the transmitter unit from the receiver unit, and to use the transmitter unit separately in monitoring particular detecting zones. It is still another object of the present invention to provide a video monitoring system which enables the user to change the default values, and to set parameters including cordless alarm code, length of sound of alarm, length of arm/outdoors delay time, length of alarm/indoors delay time, length of picture switching time interval.

DETAILED DESCRIPTION OF THE PREFERRED EMBODIMENT

Figure 1:
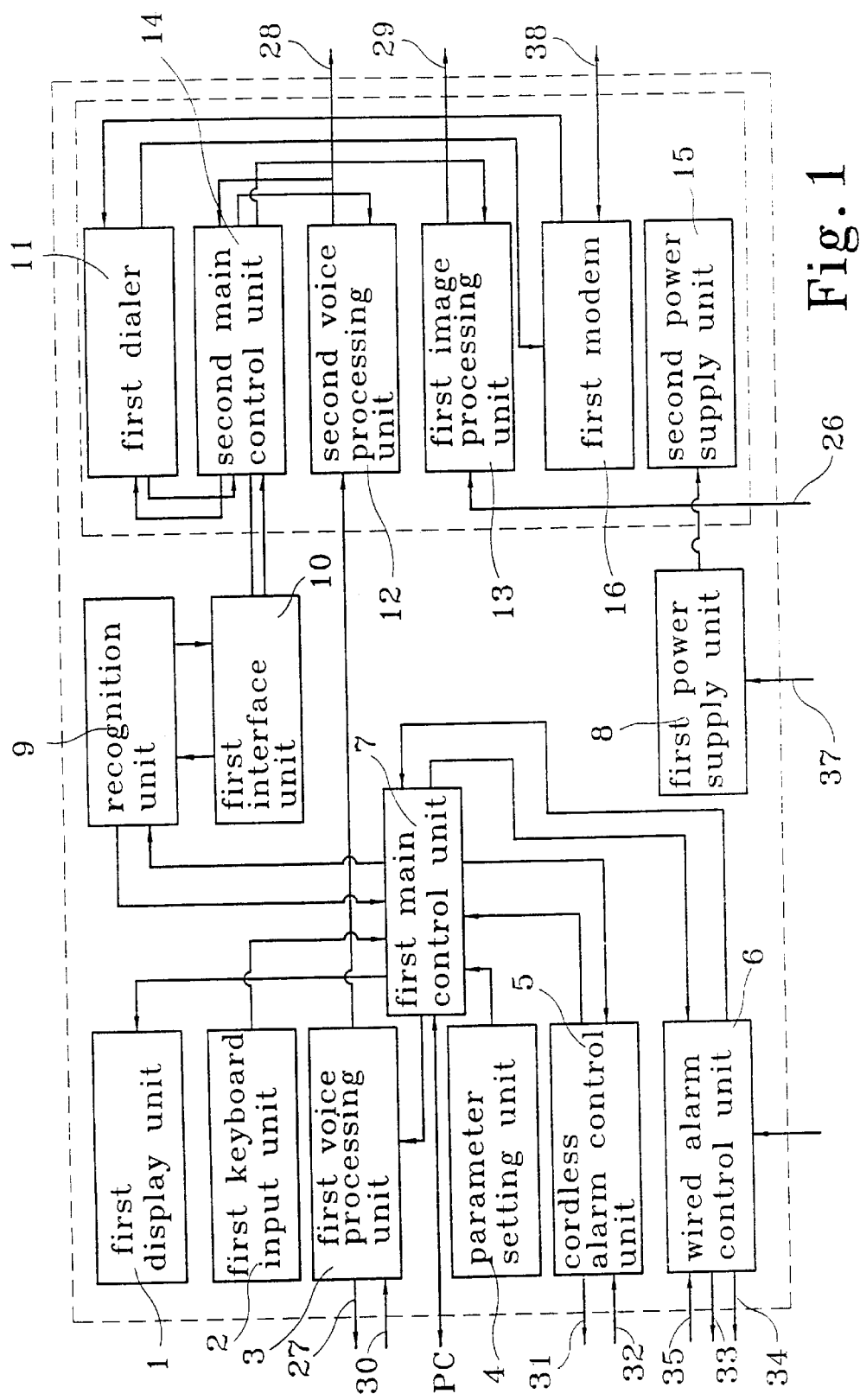
FIG. 1 is a circuit block diagram of a transmitter unit for a video monitoring system according to the present invention.
Figure 2:
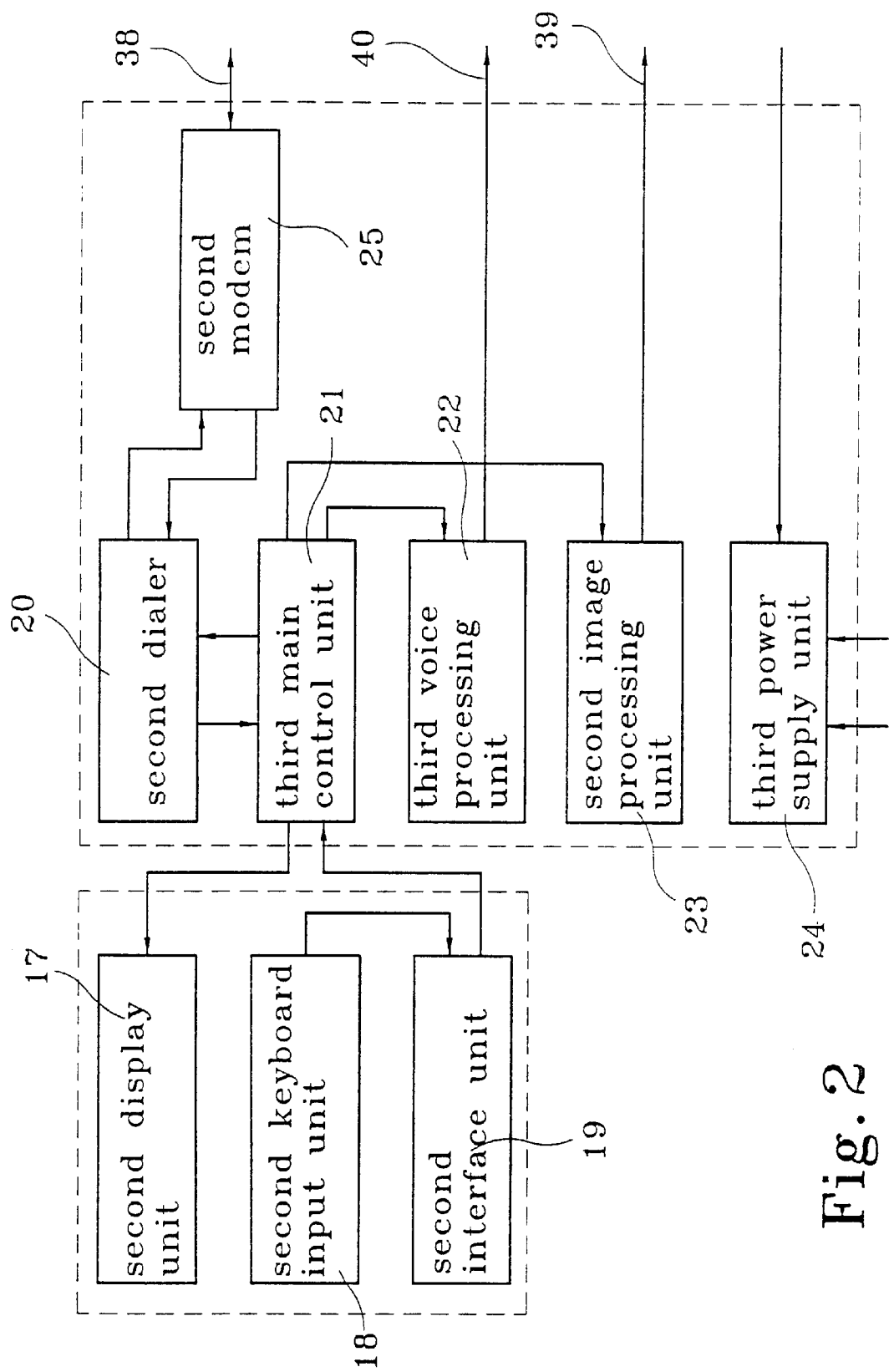
FIG. 2 is a circuit block diagram of a receiver unit for a video monitoring system according to the present invention.
Figure 3:
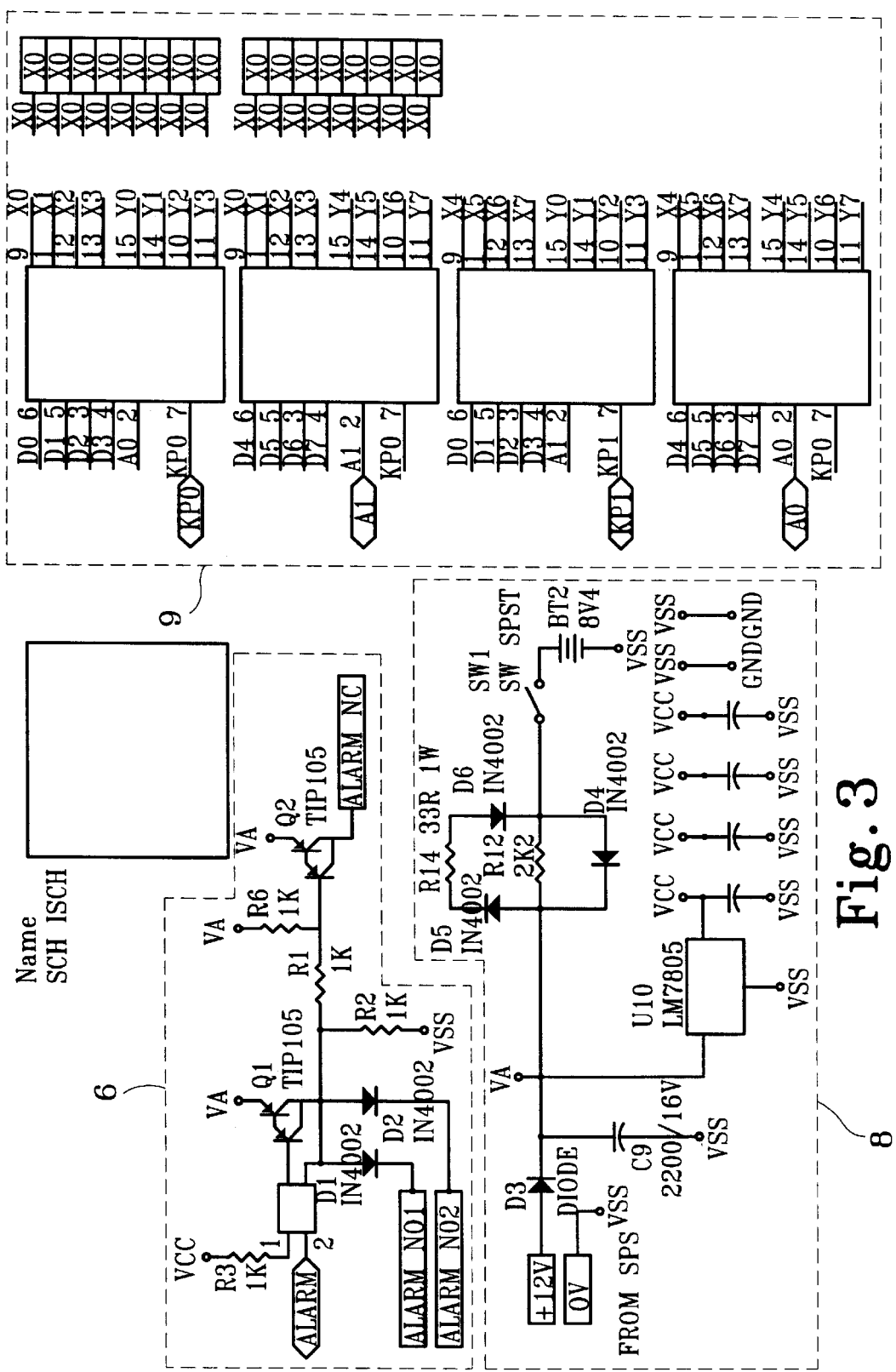
FIG. 3 is a circuit diagram of the present invention (Part I).
Figure 4A:
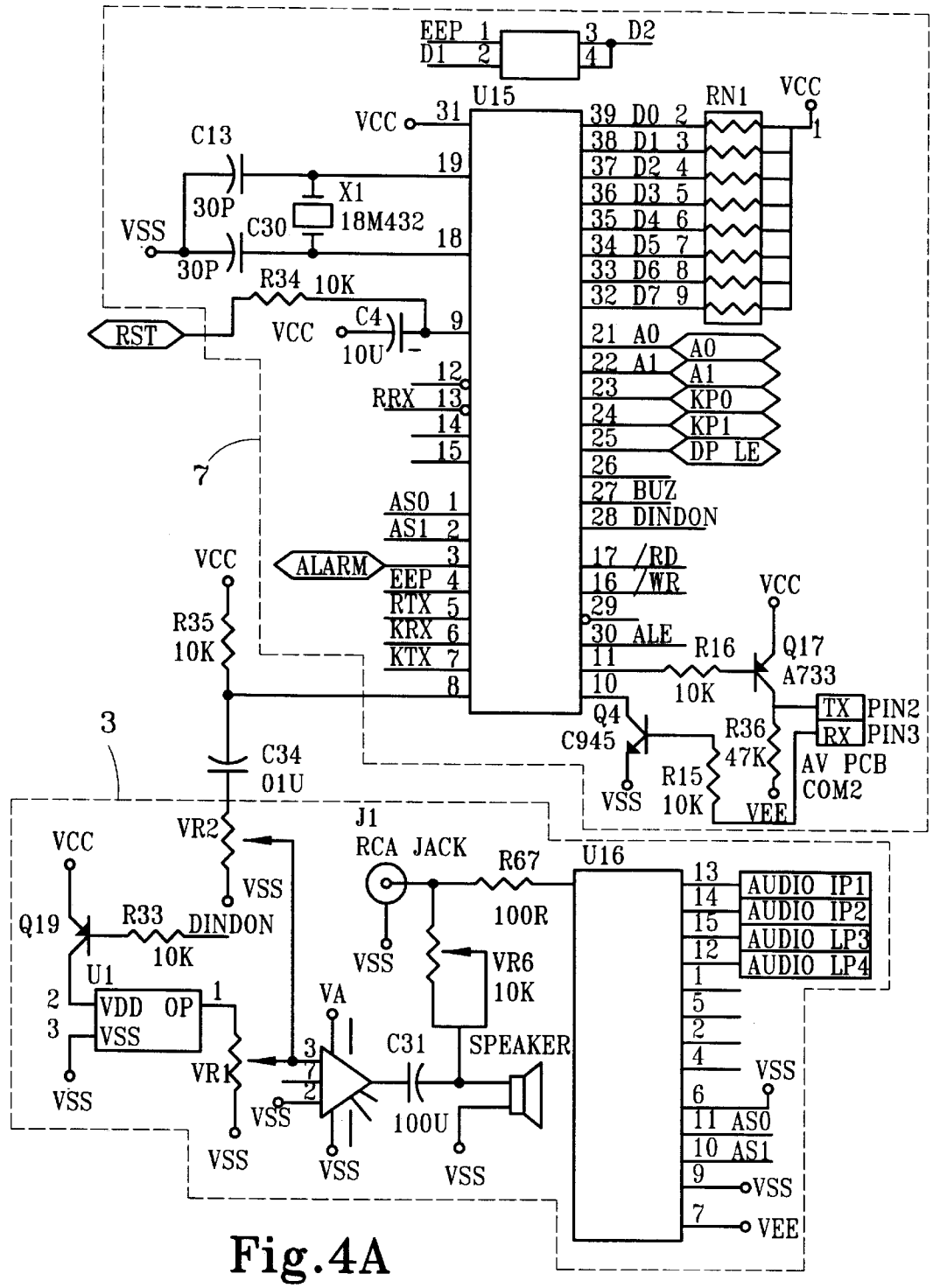
FIG. 4 is a circuit diagram of the present invention (Part II).
Figure 4B:
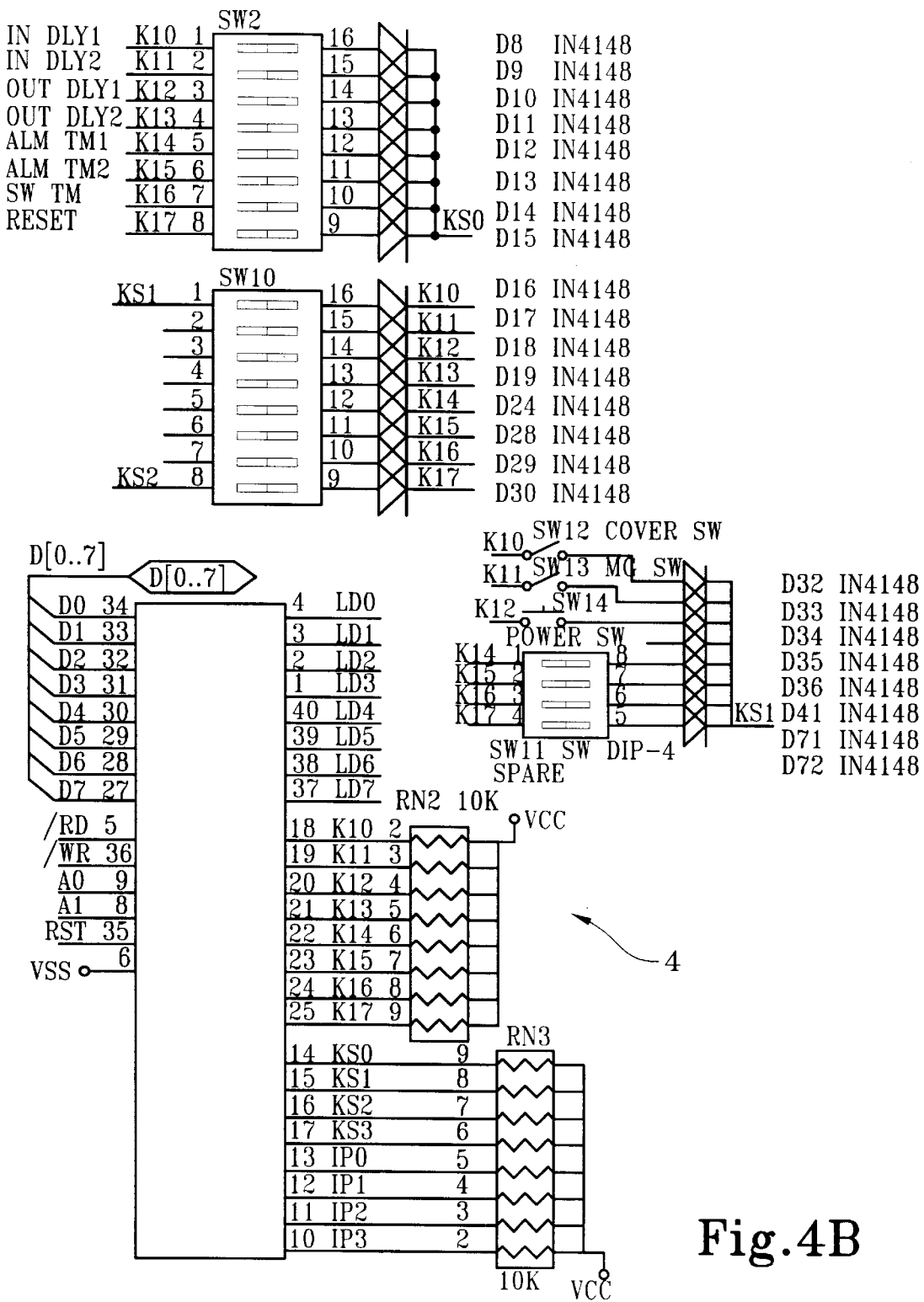
Figure 4C:
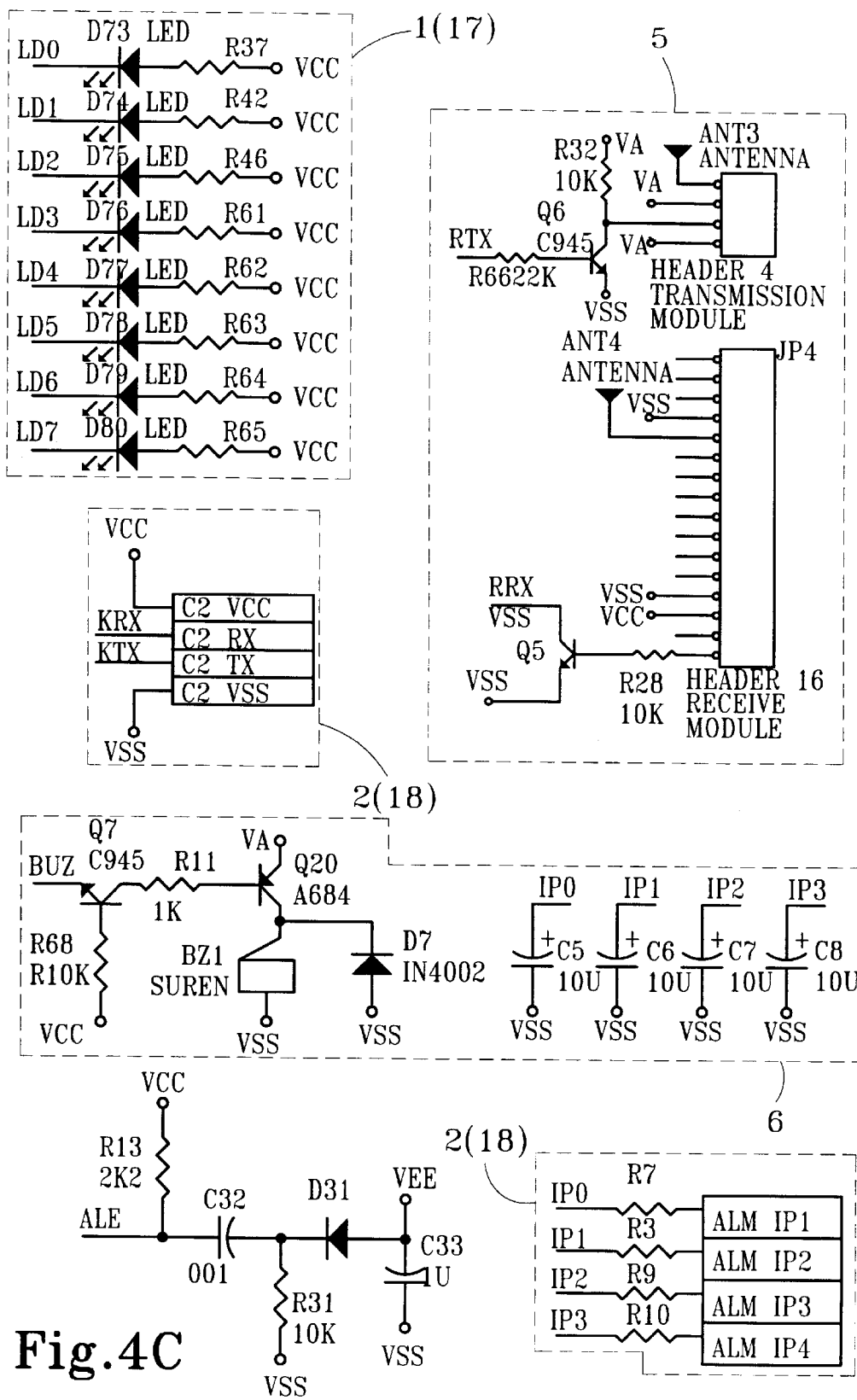
Figure 5:
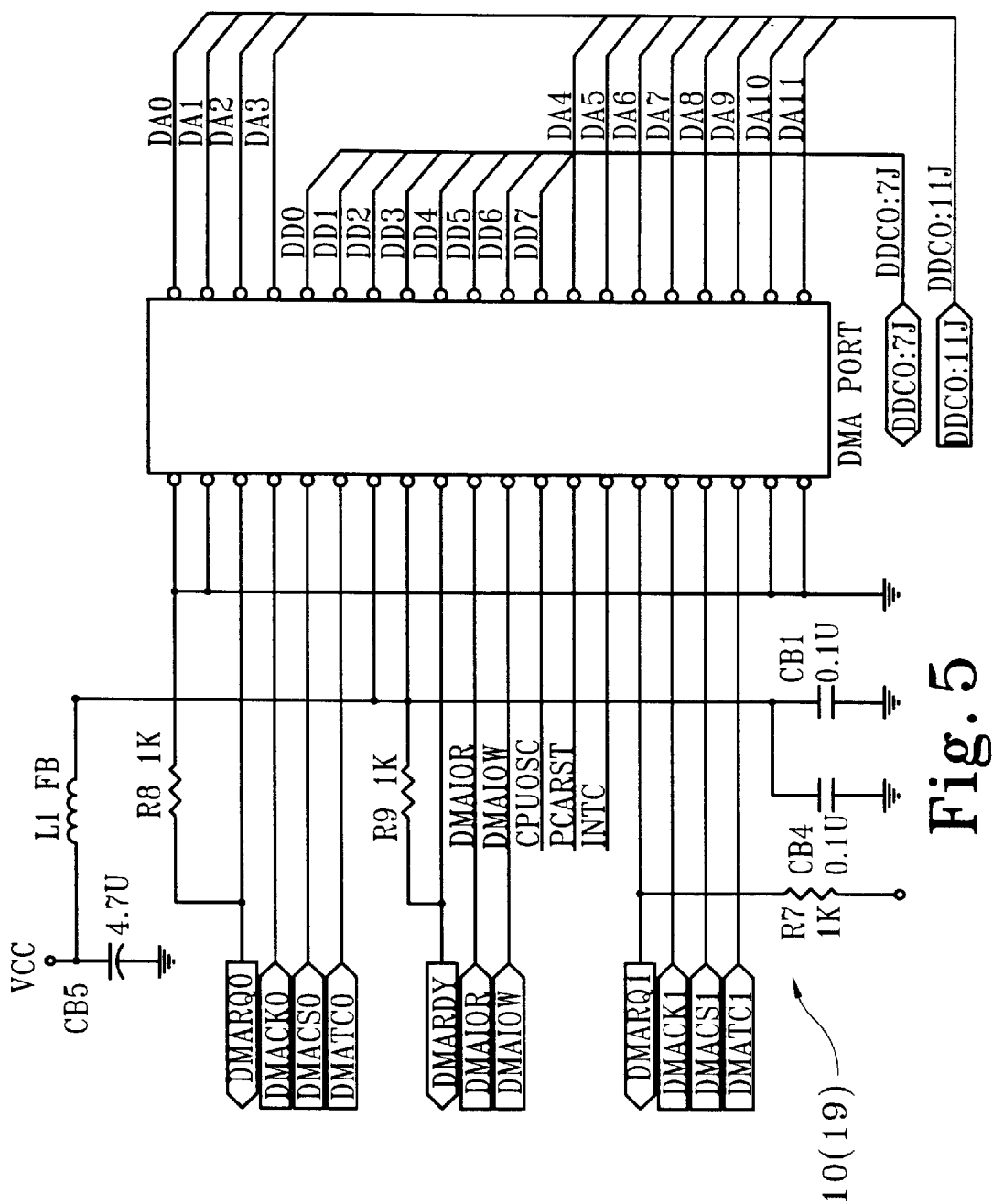
FIG. 5 is a circuit diagram of the present invention (Part III).

Referring to FIGS. from 1 through 5, a video monitoring system in accordance with the present invention is generally comprised of a transmitter unit (TX) and a receiver unit (RX). The transmitter unit comprises alarm means and audio-video means. The receiver unit comprises keyboard means and audio-video means. Because the audio-video means for the transmitter unit as well as the receiver unit can be obtained by conventional techniques and is not within the scope of the invention, it is not described in detail. Therefore, the specification explains only the architecture and operation of the alarm means of the transmitter unit and the keyboard means of the receiver unit.

The alarm means of the aforesaid transmitter unit comprises a first display unit 1, first keyboard input unit 2, a first voice processing unit 3, a parameter setting unit 4, a cordless alarm control unit 5, a wired alarm control unit 6, a first main control unit 7, a first power supply unit 8, and a recognition unit 9.

The first display unit 1 is comprised of a plurality of light emitting diodes, and controlled to display power status, arm/disarm status, detection status, power low status, and linking status. The first keyboard input unit 2 comprises 20 switches for operation by the user to set different arm/disarm and monitoring status and codes. The first voice processing unit 3 has a speaker 27 connected thereto and, which processes audio signal received from the voice output means 30 of the four video cameras 26 of the first image processing unit 13, which has a monitor 29 connected thereto, of the audio-video means and outputs processed audio signal to the second voice processing unit 12 of the audio-video means of the transmitter unit. The second voice processing unit 12 has a speaker 28 connected thereto. The parameter setting unit 4 enables the user to set parameters including cordless alarm code, length of sound of alarm, length of arm/outdoors delay time, length of alarm/indoors delay time, length of picture switching time interval. The cordless alarm control unit 5 receives signals from sensor means at one or at least four detecting zones 32, and is controlled to output signal to an external cordless peripheral apparatus 31. The wired alarm control unit 6 receives signals from sensors means at one or at least four detecting zones 35, and is controlled to output signal to a VCR (video cassette recorder) and wired alarm devices 33 and 34. The wired alarm control unit 6 is connected to a battery lid lead wire 36. When the VCR is installed, N/C, N/O, COM are connected for real time recording. The wired alarm control unit 6 outputs 12V when a wired alarm is connected. Further, the battery lid comprises switch means (not shown). When the battery lid is opened after setting of the parameter setting unit 4, the wired alarm control unit 6 is triggered to output an alarm signal. This security design prohibits other people from operating the system illegally. The first main control unit 7 controls the operation of the circuit of every unit of the alarm means of the aforesaid transmitter unit. The first recognition unit 9 compares input code received from the first keyboard input unit 2 through the first main control unit 7 with set code, and connects the audio-video means of the transmitter unit through a first interface unit 10 when input code recognized. The first power supply unit 8 is controlled by a power switch 37 to provide the alarm means of the transmitter unit with the necessary power supply, and to output power supply to the audio-video means of the transmitter unit through a second power supply unit 15.

The keyboard means of the aforesaid receiver unit comprises a second display unit 17, a second keyboard input unit 18, and a second interface unit 19. The second display unit 17 is comprised of a plurality of light emitting diodes for showing power status and linking status. The second keyboard input unit 18 comprises 20 key switches for operation by the user to set different arm/disarm and monitoring status and codes. The second interface unit 19 transmits arm/disarm and code input data from the second keyboard unit 18 to a third main control unit 21 for processing.

When power supply is connected, the first control unit 7 of the alarm means and the second main control unit 14 of the audio-video means are started, enabling the cordless alarm control unit 5 and the wired alarm control unit 6 to be controlled by the user through the first keyboard input unit 2 to start detection. By means of the operation of the first dialer 11, detected audio and video signals are transmitted through a first modem 16 at the transmitter unit, to a second modem 25 at the receiver unit via a telephone line 38.

When the picture mode control key switch MODE of the first keyboard unit 2 is depressed, a signal is transmitted through the first main control unit 7, the recognition unit 9, the first interface unit 10 and the second main control unit 14 to the first image processing unit 13, causing it to switch display mode, and to let different pictures be displayed on monitors 29 and 39 which are respectively connected to the first image processing unit 13 and the second image processing unit 23.

When the single picture display control key switch CH is depressed, a signal is transmitted through the first main control unit 7, the recognition unit 9, the first interface unit 10 and the second main control unit 14 to the first image processing unit 13, causing it to control the four video cameras 26 and to let four pictures be simultaneously displayed on the monitors 29 and 39. At the same time, audio signals from the video cameras 26 are respectively processed through the first voice processing unit 3 and the second voice processing unit 12 and then outputted through the speakers 27 and 28, or processed through the third voice processing unit 22 and then outputted through the speaker 41.

When a particular condition is detected by the cordless alarm control unit 5/wired alarm control unit 6, detected signal is sent through the first main control unit 7, the recognition unit 9 and the first interface unit 10 to the second main control unit 14, causing the second main control unit 14 to drive the first dialer 11, and therefore detected signal is allowed to be transmitted through the first modem 16 to the second modem at the receiver unit, and then sent through the first dialer 20 and the third main control unit 21, causing the third main control unit 21 to start the speaker 40, which is connected to the third voice processing unit 22, and the monitor 39, which is connected to the second voice processing unit 23. When the transmitter unit is separately used, the first main control unit 7 can directly control the wired alarm control unit 6, causing the linked VCR 33 to record the current status, or the external alarm 34 to alarm.

If the battery lid is opened, the switch of the battery lid is triggered due to vibrations, or the manual alarm switch PAINC is depressed when under the arm status, an alarm signal is given through the first main control unit 7 and the cordless alarm control unit 5, or sent to the receiver unit through the first dialer 11.

When the zone key switch of the first keyboard input unit 2 is depressed, it enters through the first main control unit 7 to wired/cordless arm zone's "Active" or "Bypass".

When Setup key switch of the first keyboard input unit 2 is depressed, the first main control unit 7 controls the second main control unit 14 to make setting and storing operations, for example, to set and store system code, telephone code, alarm code, and three automatic dialing telephone numbers. When under the disarm status, the battery lid is allowed to be opened, enabling the parameter setting unit 4 to be operated to set different status.

When the third power supply uni 24 is depressed, the third main control unit 21 is started to detect the second keyboard input unit 18 and the transmitter unit. When a telephone code is inputted to the third main control unit 21 through the second keyboard input unit 18 or the transmitter unit, it is sent through the second interface unit 19 to the third main control unit 21, causing the third main control unit 21 to dial the second dialer 20, and therefore dialed signal is transmitted through the second modem 25 to the first modem 16, and then transmitted from the first modem 16 through the first dialer 11, the second main control unit 14, the first interface unit 10, the recognition unit 9 to the first main control unit 7. When recognized by the first main control unit 7, the second keyboard input unit 18 is substituted for the first keyboard input unit 2 to let the user control the transmitter unit from a remote place.

Figure 6:
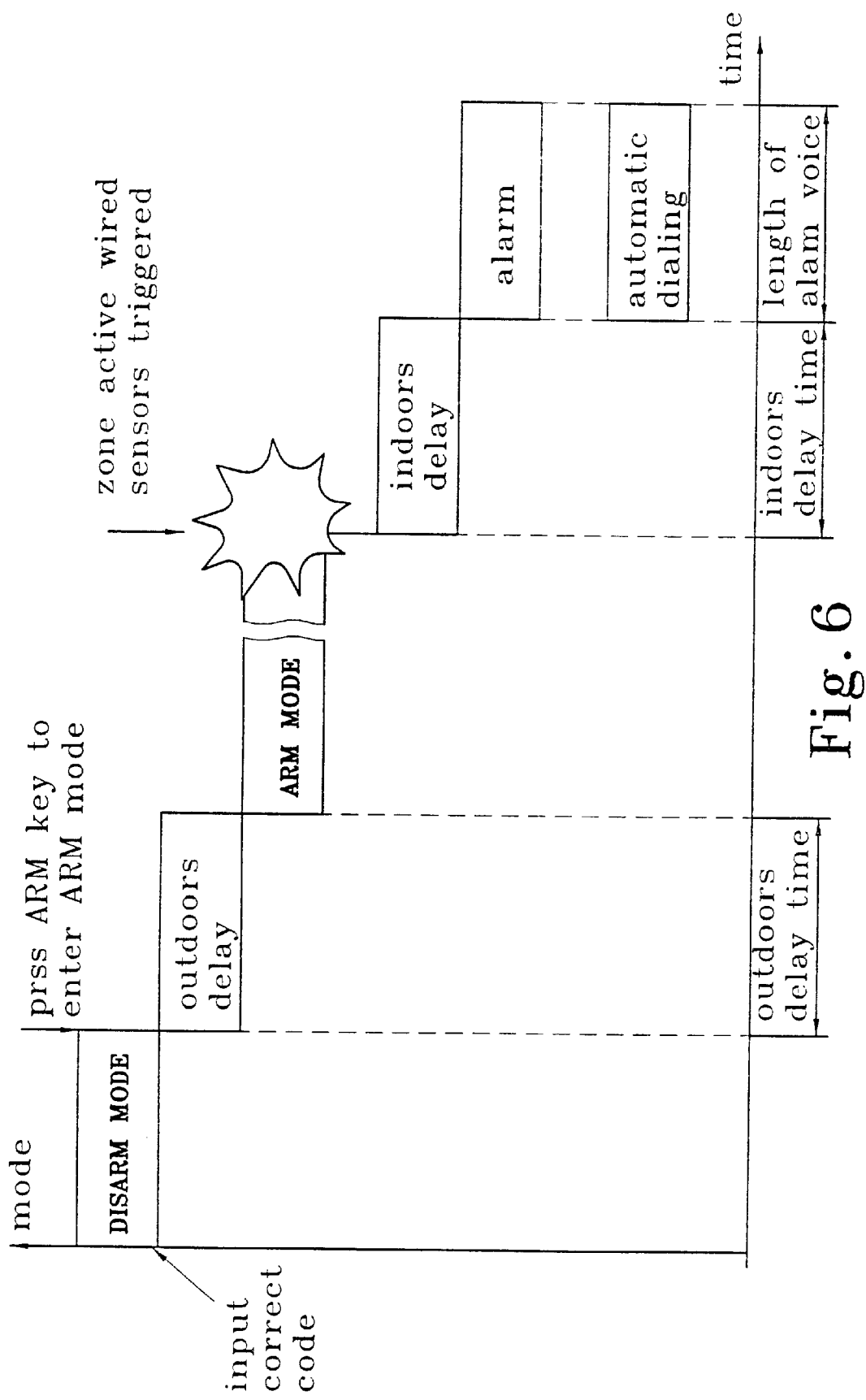
FIG. 6 is a schematic drawing explaining arm and alarm operation of the video monitoring system according to the present invention.

As indicated above, the operation of the alarm system (which includes disarm mode and arm mode) comprises the steps of:

1. Enter disarm mode: input alarm code so as to enter disarm mode when alarm code recognized. If inputted alarm code is rejected, it proceeds to: (A) input error occurs three times→keyboard locked for 60 seconds; (B) input error occurs continuously five times→give an alarm, and keyboard locked during alarm; (C) input error occurs over five times→give an alarm per each error.
2. Under Disarm Mode, the wired/cordless sensors at the four zones can be set into Active or Bypass after entering system Arm Mode (the receiver unit and connected external system are alarmed when the zone which entered Zone Active is triggered): (A) click Zone Setting Key; (B) click number keys 1~4, and it indicates Zone Active when one "Bi" sound is produced, or zone bypass when two beep sounds "Bi-Bi" are produced; (C) click Enter key when ended; (D) click CE key to return to Disarm Mode when not to set.
3. Enter Arm Mode: click Arm Key to enter Arm Mode. If Zone Active sensors are triggered during Arm Mode, it alarms and automatically dials pre-set numbers (three sets of numbers). When connected, audio and video signals (from the respective video cameras AV) are transmitted to the receiver unit, and the arm and alarm operation modes are as shown in FIG. 6 if outdoors/indoors delay time setting is made.
4. It automatically enters stand-by mode if there is no keyboard signal 60 seconds after entered Disarm Mode (if entering Disarm Mode at this stage, the code must be inputted again).
5. Click PANIC key and the receiver unit immediately alarms and dials the number.
6. Click Setup key to set telephone code, alarm code, three sets of telephone numbers and system code after entered Disarm Mode.
7. Click Reset key to return all parameters in the memory to default values.
8. Telephone line off notice: When telephone line is off, it gives a warning sound "Bi".
9. When keyboard is disconnected from the transmitter unit, it is allowed to remote-control the transmitter unit to: (A) enter Arm Mode by clicking Arm key; (B) enter Disarm Mode by inputting the correct code; (C) select any single picture to display by clicking Camera Select key; (D) enter PANIC (alarm at once) by clicking PANIC key.

As indicated above, the video monitoring system enables the user to use the receiver unit to control the transmitter unit at a remote place. The audio-video means of the transmitter unit can be connected to an external computer, enabling its operation to be controlled by the external computer.

What is claimed is:

1. A video monitoring system comprising a transmitter unit and a receiver unit, said transmitter unit comprising an alarm means and an audio-video means, said receiver unit comprising a keyboard means and an audio-video means, said receiver unit receiving status signals from said transmitter unit to achieve alarm and monitoring operations, wherein said alarm means comprises:

a first keyboard input unit for operation by the user to set arm/disarm and monitoring status and codes;

a first voice processing unit having speaker means connected thereto, said first voice processing unit being controlled to process audio signal to be transmitted to a second voice processing unit of the transmitter unit;

a parameter setting unit for enabling the user to set arm, alarm and monitoring status codes;

a cordless alarm control unit controlled to output signal to external peripheral apparatus, and to receive signals from sensor means at predetermined detecting zones;

a wired alarm control unit controlled to receive signals from sensors means at predetermined detecting zones, and to output signal to wired peripheral alarm means;

a first main control unit for controlling the operation of the sub-units of the alarm means of said transmitter unit; and a first recognition unit for recognizing codes inputted from said first keyboard input unit and a second keyboard input unit of said keyboard means of said receiver unit, for enabling said receiver unit to be linked to said transmitter unit when said transmitter unit started; said keyboard means of said receiver unit comprises:

a second keyboard input unit for operation by the user to set arm/disarm and monitoring status and codes to output set codes to said first recognition unit of said alarm means of said transmitter unit.

2. The video monitoring system of claim 1 wherein said first keyboard input unit comprises at least 20 key switches.

3. The video monitoring system of claim 1 wherein the audio-video means of said transmitter unit comprises a second voice processing unit having a speaker means connected thereto.

4. The video monitoring system of claim 1 wherein the audio-video means of said transmitter unit comprises a first image processing unit having a monitor connected thereto.

5. The video monitoring system of claim 1 wherein said parameter setting unit enables the user to set parameters including cordless alarm code, length of sound of alarm, length of arm/outdoors delay time, length of alarm/indoors delay time, length of picture switching time interval.

6. The video monitoring system of claim 1 wherein N/C, N/O, COM are connected to said wired alarm control unit (6) for real time recording when a VCR (video cassette recorder) is installed.

7. The video monitoring system of claim 1 wherein said wired alarm control unit outputs 12V when a wired alarm is connected.

8. The video monitoring system of claim 1 wherein said wired alarm control unit is connected to a battery lid having switch means, and triggered to output an alarm signal when said battery lid is opened after setting of said parameter setting unit.

9. The video monitoring system of claim 8 wherein when the battery lid is opened, the switched is triggered due to vibrations, or a manual alarm switch PAINC is depressed when under the arm status, an alarm signal is given through said first main control unit and said cordless alarm control unit, or sent to said receiver unit through a first dialer.

10. The video monitoring system of claim 1 wherein said alarm means of said transmitter unit is connected to the audio-video means of said transmitter unit through a first interface unit.

11. The video monitoring system of claim 1 wherein said alarm means of said transmitter unit comprises a first power supply unit controlled by a power switch to provide the alarm means of said transmitter unit with the necessary power supply, and to output power supply to the audio-video means of said transmitter unit through a second power supply unit.

12. The video monitoring system of claim 1 wherein said second keyboard input unit comprises at least 20 key switches.

13. The video monitoring system of claim 1 wherein said second keyboard unit transmits arm/disarm and code input data to the audio-video means of said receiver unit through a second interface unit.

14. The video monitoring system of claim 1 wherein said first keyboard input unit comprises a picture mode control key switch for operation to switch display mode, enabling different pictures be displayed on monitors, which are respectively connected to first image processing unit at said transmitter unit and second image processing unit at said receiver unit.

15. The video monitoring system of claim 1 wherein said first keyboard input unit comprises a single picture display control key switch for operation to let four pictures be simultaneously displayed on monitors at said transmitter unit and said receiver unit.

16. The video monitoring system of claim 1 wherein said first keyboard input unit comprises a zone key switch, which when depressed, enables said first main control unit to enter setting of wired/cordless arm zone's "Active" or "Bypass".

17. The video monitoring system of claim 1 wherein said first keyboard input unit comprises a Setup key switch, which when depressed drives said first main control unit to control a second main control unit to make setting and storing operations, for example, to set and store system code, telephone code, alarm code, and three automatic dialing telephone numbers.

18. The video monitoring system of claim 1 wherein the audio-video means of said receiver unit comprises a third power supply unit, which when depressed, enables said second keyboard input unit to be substituted for said first keyboard input unit to let the user control said transmitter unit from a remote place.

19. The video monitoring system of claim 1 wherein the audio-video means of said transmitter unit is connected to an external computer, which controls the operation of said transmitter unit.

\* \* \* \* \*